United States Patent [19]
Enders

[11] 3,926,237
[45] Dec. 16, 1975

[54] SELF-LOCKING VIBRATION-PROOF LOCK WASHER AND COOPERATING THREADED FASTENER

[76] Inventor: Max L. Enders, 965 N. Fair Oaks, Pasadena, Calif. 91103

[22] Filed: Aug. 2, 1973

[21] Appl. No.: 384,811

Related U.S. Application Data

[63] Continuation-in-part of Ser. No. 239,488, March 30, 1972, abandoned.

[52] U.S. Cl. .................................. 151/34; 151/35
[51] Int. Cl.² .................................... F16B 39/282
[58] Field of Search.......................... 151/34, 35, 37

[56] References Cited
UNITED STATES PATENTS

| 595,215 | 12/1897 | Smith | 151/34 |
|---|---|---|---|
| 3,241,589 | 3/1966 | Enders | 151/34 |
| 3,263,727 | 8/1966 | Herpolsheimer | 151/34 |
| 3,640,326 | 2/1972 | Brown | 151/37 |

FOREIGN PATENTS OR APPLICATIONS

| 2,473 | 9/1896 | United Kingdom |

*Primary Examiner*—Edward C. Allen
*Attorney, Agent, or Firm*—Sellers and Brace

[57] ABSTRACT

A self-locking vibration-proof washer and fastener assembly utilizing a lock washer cooperating with a threaded shank having retainer means near one end provided with a concentric ring of teeth each having a generally radial face and a helical face having a pitch of the order of double the pitch of the shank threads. The higher end of these teeth seat against the rim edge at one end of the central opening through the washer and adjacent the shallow end of a ring of notches formed in the rim edge of the washer bore. The lock washer is designed for inexpensive blanking by a punching operation performed on high strength metal stock having a tensile strength very substantially greater than that of a fastener shank and harder than the surface of a workpiece against which the washer is to seat. The load forces are transferred between the retainer and into the lock washer along lines diverging outwardly into the washer at an obtuse angle with the result that the tightening of the fastener loads the washer in hoop tension. The generally rectangular cross-sectional area of the washer together with the strength of the material is sufficient to develop the full design strength of the fastener shank.

The washer may be and preferably is dished, preferably but not necessarily, as an incident of the punchout blanking operation, and its convex end face is provided with low-height, sharp-edged teeth having one face inclined acutely and the other inclined obtusely to the end face and in direction enabling the teeth to glide over the workpiece surface during tightening of the fastener and to dig into the workpiece surface upon any tendency of the fastener to loosen. A keeper having a press fit over the fastener shank serves to hold the washer captive adjacent the retainer at one end of the shank.

26 Claims, 8 Drawing Figures

SELF-LOCKING VIBRATION-PROOF LOCK WASHER AND COOPERATING THREADED FASTENER

This application is a continuation-in-part of my co-pending application for U.S. Letters Patent Ser. No. 239,488, filed Mar. 30, 1972, entitled "Self-Locking Vibration-Proof Fastener Assembly" and now abandoned.

This invention relates to self-locking fastener means and more particularly to an improved self-locking vibration-proof lock washer and fastener assembly of unusual strength and versatility designed for manufacture economically in mass quantities.

Many proposals have been made heretofore by numerous designers to provide a reliable, vibration-proof lock washer and threaded fastener. These proposals have embodied various expedients. Some of these proposals make use of a set of surfaces concentric with the fastener threads but having a greater pitch than the thread with the objective of utilizing the auxiliary surfaces of greater pitch to increase the tensile stress in the fastener shank as an incident to any tendency of the fastener to loosen. This principle is sound and can produce reliable results in a properly designed operating environment. However, most of the prior proposals attempting to utilize this principle are subject to certain disadvantages and shortcomings avoided by the present invention. In general, these designs are characterized by their complexity, high precision manufacturing requirements, unsuitability for use under misaligned conditions, high tooling and manufacturing coats, ill-adaptiveness for mass production, and their unacceptably high manufacturing cost.

The self-locking fastener shown in my U.S. Pat. No. 3,241,589 avoids many of the shortcomings inherent in prior locking fasteners and is a highly satisfactory and reliable fastener but unfortunately its design involves undesirably complex manufacturing operations with the result that it can be produced only at a premium price. Additionally, if the lock washer is made sufficiently large in diameter to accommodate more extreme misalignment conditions, the required diameter of the stock is excessive, its cost is very substantially increased and the amount of room required for the washer can exceed that available in a particular operating environment. Moreover, the load forces are transmitted via line contact between helical surfaces of the washer and fastener and spaced undesirably distant from the sidewall of the fastener shank. If the inner or adjacent end of the nut is reduced in diameter to obtain line contact closer to the shank threads, the radial dimension of the nut is so small that this portion of the nut fails by being crushed inwardly and jammed against the shank threads. This failure in my prior lock assembly can occur when the fastener has been only partially tightened, thereby giving a false indication of complete tightening. Additionally the toothed conical inner periphery of the lock washer is incapable of production by punch blanking but must be formed by special machining operations, and this adds greatly in the complexity and cost of manufacture, to leave unmentioned the fact that this type of lock washer inherently increases its overall dimensions.

The present invention avoids the foregoing and other disadvantages of prior self-locking fastener constructions. The invention employs the principle of differential pitch between the fastener threads and that of the surfaces effective to increase the shank stresses on any tendency of the fastener to loosen, this principle being embodied in a construction adapted for economical mass production. More specifically, the lock washer component of the invention, in a preferred embodiment, eliminates the wide, helical surfaces heretofore forming the bore of the washer. Instead, the present washer is blanked or punched from high strength, very hard bar stock. Thereafter, shallow tapering notches are swaged, forged or broached along one inner rim edge of the cylindrical central bore with the leading end at the deeper end of the notches merging with a shoulder lying in a generally radial plane. The depth of the notches is such that the major portion of notch bottoms are out of contact with the helical surfaces on a cooperating fastener part and whereby the trailing edge portion of the notches becomes the load bearing surface as the fastener is tightened against the washer. Accordingly, the principle load bearing point of contact between the washer and the fastener is the portion of the inner rim edge of the washer bore between the deep end of one notch and the trailing end portion of the next adjacent notch.

The washer has self-aligning capabilities limited only by the clearance provided between the fastener shank and the washer bore. Substantial misalignment capabilities are achieved inherently as an incident to the washer blanking operation wherein the bore wall tapers or diverges to a limited degree. Loosening rotary movement of the washer is positively prevented by a ring of low-height barb-like or sharp-edged teeth on the end face engaging the workpiece and so shaped as to cam over the workpiece surface during tightening of the fastener, if this necessitates rotation of the washer, and which teeth instantly dig into and interlock with the workpiece on any tendency of the parts to loosen.

The washer is preferably dished for reasons which will be explained in detail in the body of the specification and is preferably made of very high strength material. The washer may be heat treated or otherwise processed to harden it after the manufacturing operations have been performed. However, the present washer design is readily manufactured from flat bar stock of the requisite thickness, strength and hardness thereby avoiding the need for heat treating or other hardening or tempering conditions. Desirably, the washer material is substantially harder than the workpiece to the end that the washer may be reused repeatedly with full initial use and effectiveness.

Accordingly, it is a primary object of the present invention to provide an improved, low coat, mass-producible self-locking vibration-proof lock washer per se as well as a component of a threaded fastener assembly.

Another object of the invention is the provision of a novel lock washer for use about the shank of a threaded fastener and having shallow notches formed along one rim edge of its central bore or opening each including a short face lying in a generally radial plane and a relatively long face converging inwardly toward the washer axis and normally out of contact with the juxtaposed helical surfaces on the retainer end of a threaded fastener.

Another object of the invention is the provision of a self-locking washer for use with threaded fasteners having low-height generally radially disposed sharp-edged teeth along one end face shaped to cam over a workpiece surface as the washer is rotated in one direction and to dig into that surface upon any tendency of the loaded washer to rotate in a reverse direction.

Another object of the invention is the provision of a self-locking washer for threaded fasteners having barb-like teeth on one end face adapted to penetrate into the surface of a workpiece on any tendency of the washer to loosen by counter-rotation and having a ring of notches along the rim edge of the washer bore remotely from the barb-like teeth and so designed that the fastener load is transmitted to the washer along that portion of the rim edge of the washer bore located between the deep end of one notch and the trailing end of the next adjacent notch.

Another object of the invention is the provision of an improved, wrenchable lock washer blanked from high strength sheet stock harder than the workpiece to be clamped and having a concave fastener engaging end surface and a convex workpiece engaging surface the latter of which is formed with sharp-edged teeth strongly resisting loosening of a fastener assembled to said washer.

Another object of the invention is the provision of a lock washer having a convex workpiece engaging surface formed with low-height, sharp-edged teeth crosswise thereof which feather at the outer ends thereof into a merger with said convex surface.

Another object of the invention is the provision of a self-locking washer having a ring of tapering notches along the rim edge of one end of the washer bore the major portion of the deeper end of which need not be precision formed and are adapted to be out of load bearing contact with a cooperating helical surface of a threaded fastener usable therewith and only the shallow trailing end of which notches are adapted to be in load bearing contact with the threaded fastener component.

Another object of the invention is the provision of a self-locking, vibration-proof fastener having a high strength lock washer provided with a ring of hard barb-like teeth on one end and having a punch-formed central bore and having a ring of notches at the rim end of the bore remote from the barb-like teeth and which notches taper circumferentially of the bore rim in an amount slightly greater than the pitch of the helical surface of cooperating locking teeth formed in the conical end surface of retainer means on one end of a threaded fastener.

These and other more specific objects will appear upon reading the following specification and claims and upon considering in connection therewith the attached drawing to which they relate.

Referring now to the drawing in which a preferred embodiment of the invention is illustrated:

Figure 1:
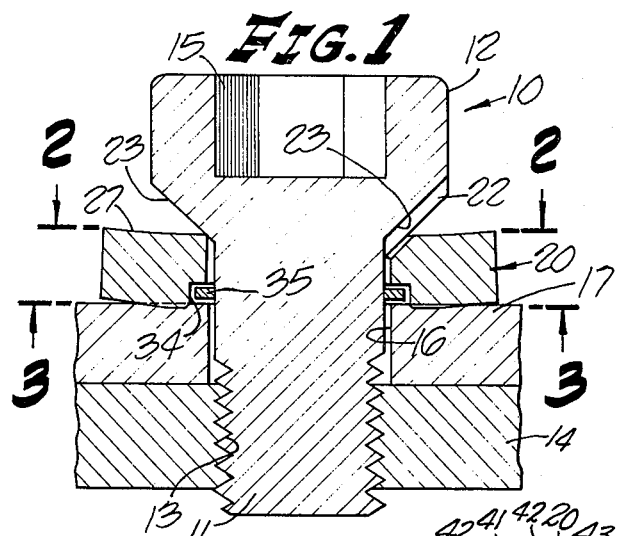
FIG. 1 is a longitudinal cross-sectional view through an illustrative embodiment of the invention self-locking fastener fully tightened and assembled to a pair of workpieces.

Referring initially more particularly to FIGS. 1 to 4, there is shown an illustrative embodiment of the invention fastener, designated generally 10, having a threaded shank 11 formed at one end with an integral head or retainer means 12 and mating at its threaded end with the threaded bore 13 in a workpiece 14. In the interest of minimum weight and size, retainer 12 is shown as having a cylindrical exterior and an Allen-head socket 15 to accommodate an Allen-type wrench. As here shown, the threaded fastener comprises a cap screw the shank of which extends through a hole 16 of a second workpiece 17, and into the threaded bore of the first-mentioned workpiece 17, and into the threaded bore of the first-mentioned workpiece 14. Embracing shank 11 is the invention lock washer 20.

Retainer 12 is forged with a conical undersurface facing toward lock washer 20 and inclined to the shank axis at a suitable angle, such as 45°. This surface is suitably formed in a forging or cold-working operation by suitable tooling thereby to provide a ring of cam teeth having a relatively short face 22 lying in a radial plane and a relatively long helical camming face 23 interconnecting the crest of one tooth and the root end of the next adjacent tooth. A helical surface 23 has a pitch of the order of double the pitch of the threads on threaded shank 11 with the pitch angle extending in the same direction as the pitch angle of the shank threads.

Again referring more particularly to FIGS. 1, 2 and 4 the salient features of the lock washer 20 will be described. This washer is preferably blanked or punched from very tough high strength hard material such as SAE-4340, Chromaloy steel, or other material having like properties and characteristics and a hardness substantially greater than that of the workpiece 17 or other workpiece against which the washer is pressed in its assembled condition.

Figure 5:
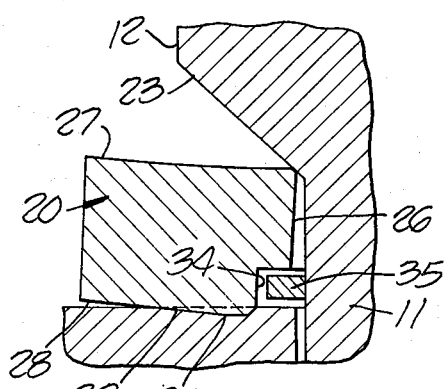
FIG. 5 is a fragmentary view on an enlarged scale of a portion of FIG. 1 to show certain constructional details.
Figure 3:
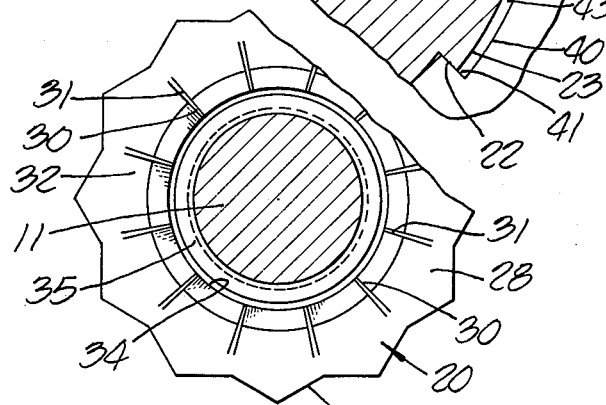
FIG. 3 is a cross-sectional view taken along line 3—3 on FIG. 1.
Figure 6:
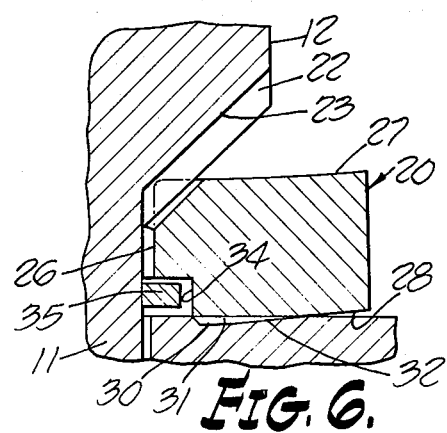
FIG. 6 is a view similar to FIG. 5 but illustrating details of the assembly diametrically opposite the showing in FIG. 5.

Washer 20 is preferably blanked from the flat bar material with a double hexagonal perimeter 25 and a cylindrical central opening or bore 26. The punching operation is preferably carried out in such manner as to dish the washer thereby providing a concave outer end surface 27 and a convex undersurface 28 designed to lie in contact with workpiece 17. As is best shown in FIGS. 5 and 6, convex lower surface 28 is also forged or upset to provide a ring of shallow barb-like sharp-edged teeth 30. Each tooth 30 has a sharp edge extending generally radially of the washer lying between and interconnecting a very shallow substantially upright wall 31 and a relatively long acutely inclined surface 32. The face 32 extends a substantial distance toward the root end of the adjacent shallow tooth and serves as a camming surface effective to cause the washer to glide over the surface of the workpiece while the washer is being rotated along with the fastener during tightening of the latter. However, if there is any tendency for the fastener to counter-rotate in a loosening direction the sharp edge of each of the teeth 30 instantly digs into the juxtaposed surface of the workpiece 17 and to prevent and lock the washer against such counter-rotation. It will be understood that, owing to the convex surface 28 in which teeth 30 are formed and the shallow depth of these teeth, the outer ends of sharp edge crests feather out and merge with the convex surface in an area spaced inwardly from the outer periphery of the washer, as is best shown in FIG. 3. The inner ends of each tooth, as here shown, terminate flush with the sidewall of an annular recess 34 sized to loosely accommodate a keeper ring 35 having a press fit with the shank of threaded fastener 11. These details are best shown in FIGS. 5 and 6, it being understood that the function of keeper 35 is to hold lock washer 20 loosely assembled to the fastener shank with concave surface 27 facing the helical surfaces 23 of the fastener retainer head 12. As will be recognized, keeper 35 is not essential but performs a useful function in holding the parts properly assembled and in readiness for assembly to one or more workpieces.

The rim edge of bore 26 merging with the concave end face of washer 25 is forged, broached or otherwise formed with a ring of shallow tapering notches 40 (FIG. 4) the bottoms of which converge inwardly toward the convex end face of the washer and which are appreciably deeper at their leading ends than at their trailing ends. The leading end of each notch 40 merges with a relatively short radially disposed end wall 41 whereas the trailing shallow portion 42 of each notch is shaped to seat against and have high load bearing contact with the juxtaposed deep end portion of camming surfaces 23 on retainer means 12. The tapering bottom surface 43 at the deep end of each notch 40 is a generally planar surface inclined toward the convex end surface of the washer at an angle which is preferably a few degrees in excess of the angle of surfaces 23, as for example 47°–49°. As is made clear in FIG. 4 the lateral edges at both ends of notches 40 converge and merge with the adjacent rim edge of central opening 26. This is equally true of the lateral edges of the radial end wall 41 and of the long lateral edges of the generally helical surfaces 43. With respect to the latter merging edges of notches 40 it will be understood that the point of merger may be substantially at the edge of end wall 41 of the adjacent notch as is shown in FIG. 4, or spaced a substantial distance therefrom as is shown in FIG. 4a.

It will be understood that a major portion of the surface area of central bore 26 of the washer is generally cylindrical despite the fact that portions of one end of this bore are upset in the forging or cold forming operation when forming notches 40.

Figure 4:
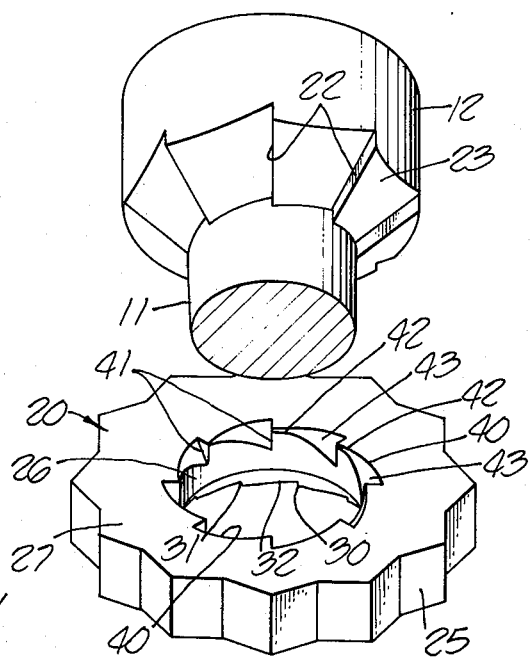
FIG. 4 is a fragmentary perspective view of the washer and bolt head shown in FIG. 1.
Figures 2, 4A:
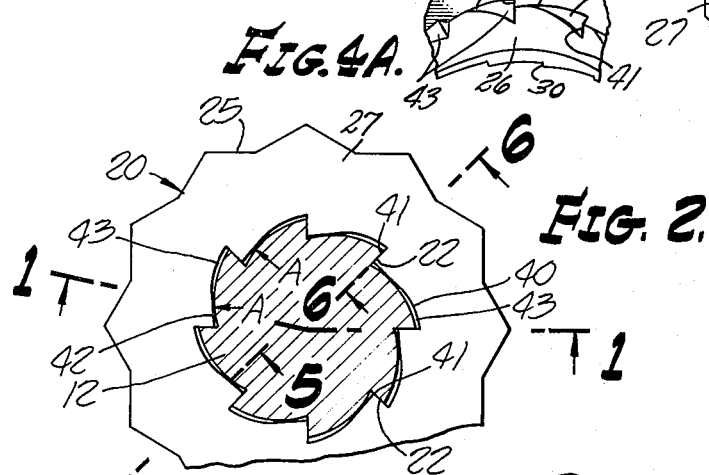
FIG. 2 is a cross-sectional view taken along line 2—2 on FIG. 1.
FIG. 4a is a fragmentary view of the lock washer showing a modified disposition of the notches at the rim of the central bore.
Figure 2A:
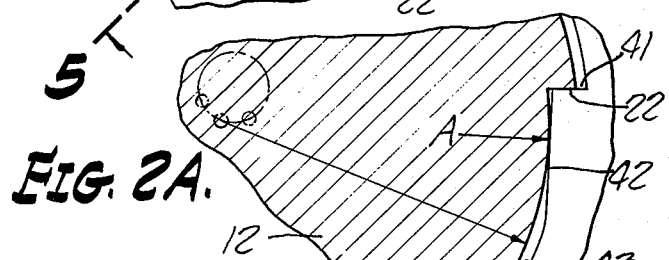

FIG. 4a shows the same washer as FIG. 4 except that the adjacent ends of notches 40 merge with the rim edge of bore 26 at points spaced from one another along this rim edge.

It will be understood that the major load bearing portion 42 of notches 40 is preferably spaced somewhat in advance of the shallowest portion of the notch as, for example, one fifth of the arcuate distance to end wall 41 at the deepest end of the notch. It is further pointed out that the major portion of the notch bottom preferably lies radially outwardly of the helical surface 23 of the fastener retainer when the latter is in its fully assembled tightened position. For this reason this major portion of the notch bottoms need not be made to careful tolerance specifications, it only being desirable that this surface lie out of contact with helical surfaces 23. This helical surface may be conveniently designated as an imaginary helical surface for reference purposes when defining the bottoms of the washer notches in the appended claims.

OPERATION

The operating principles of the invention self-locking washer and fastener assembly will be quite evident from the foregoing description. Preferably, lock washer 20 is held pre-assembled about the shank and close to the conical end of retainer means 12 by the keeper ring 35. Accordingly, the pre-assembled unit is readily assembled into the workpiece by inserting the threaded end 11 into the workpiece bore hole to engage the threads 13 of the workpiece. Normally, one or more other workpieces, such as 17, are interposed between workpiece 14 and the fastener retainer means 12. As the barb-like teeth 30 of the convex face of the washer engage the surface of workpiece 17 the fastener may rotate slightly relative to the washer until the radial faces 22 of the retainer engage end surfaces 41 of notches 40. The washer then rotates in synchronism with the fastener as tightening continues. The acutely inclined surfaces 32 of the barb-like teeth 30 glide over the surface of work-piece 17 without digging into this surface. As tightening proceeds the helical surfaces 23 engage the trailing shallow ends of notches 40 as is indicated by the arrows at A,A in FIG. 2. As will be apparent, particularly from the detailed description of these notches and camming surfaces 23 and a consideration of FIG. 1, the load forces acting in the fastener are transmitted into the washer through each of the load bearing surfaces and along force lines inclined generally at 45° to the axis of the fastener and diverging outwardly into the body of the washer. These forces therefore cooperate in placing washer 20 under high hoop tension stress. The cross-sectional area and material of the washer are selected so as to develop the full design tensile strength of the fastener shank without exceeding the tensile strength of washer 20. Even if the yield point of the washer material is exceeded the washer continues to function as previously since the washer continues to be highly stressed in hoop tension. Part of the load stresses are converted into hoop tensile stresses in the washer and others into compression stresses acting between the fastener and the washer and other compression stresses acting between the washer and the workpiece.

To be noted in particular from FIG. 1 is the fact that the load bearing surfaces between the washer and the fastener are spaced quite close from the sidewall of the fastener shank. This spacing may vary over a small range and is increased, particularly, if it is desired that the fastener and washer be capable of accommodating a wider degree of misalignment. It will be understood that the typical result of a punch-forming the central bore results in the bore sidewalls tapering slightly from the axis of the washer with the larger end being adjacent the convex face of the washer. This small angle taper departs only very slightly from a true cylindrical surface but is adequate to accommodate normally encountered misalignment conditions thereby permitting the load bearing surfaces of the notches to be located very close to the fastener shank. If provision is desired for greater misalignment conditions, the central bore is either made somewhat larger or, alternatively, the central bore may be reamed to increase its taper angle by a few degrees.

Should shock forces, vibration conditions, or other causes tend to loosen the tightened fastener, the slightest loosening tendency of the fastener parts has two principle effects. One is to counter-rotate the high pitch helical surface 23 against the load bearing surfaces at the trailing ends of notches 40 causes surfaces 23 to increase the pressure on the load bearing areas at A,A, (FIG. 2) by virtue of the differential pitch between surfaces 23 and the pitch of screw threads 13.

Secondly, this increase loading and the resulting effect thereof tending to rotate washer 20 in a loosening direction causes the barb-like teeth 30 to dig into the surface of the workpiece 17 thereby firmly and positively locking the washer against counter-rotation. Any further tendency of the fastener to loosen greatly increases the load bearing force between surfaces 23 and the trailing ends of notches 40 and abruptly increases the tension forces acting in the fastener shank thereby not only strongly and powerfully resisting loosening of the fastener but actually increasing the tightness of the fastener.

However, if the user wishes to loosen the fastener he applies a wrench to the double hex exterior perimeter of washer 20 and uses the wrench in the usual manner. This causes the low-height end walls 22 of the retainer teeth to engage the corresponding end surfaces 41 of the washer notches 40 with the result that the fastener shank is caused to rotate in synchronism with the washer thereby unthreading the fastener from threads 13. Initial unwrenching movement is of course resisted by the barb-like teeth 30 digging into the workpiece surface but these teeth can be forcibly rotated. A relatively small amount of unwrenching movement is required to disengage teeth 30 from the workpiece since the height of these barbs is relatively small compared to the pitch height of threads 13. Since the material of washer 20 is substantially harder than workpiece 17, teeth 30 are not damaged and can be reused time after time with full locking effectiveness.

While the particular self-locking vibration-proof lock washer and cooperating threaded fastener herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A lock washer comprising a continuous ring of material substantially harder than the workpiece against which said ring is to be compressed in its assembly environment, said ring being generally rectangular in cross section and of sufficient area to have a hoop tension strength at least as great as the design tension strength of the largest diameter threaded shank usable with said washer, the outer periphery of said washer having wrench-engaging surfaces usable to rotate said washer about the axis thereof, a first end face of said washer having a plurality of low-height sharp-edged teeth extending generally radially thereof with one face of each inclined obtusely and the other face of each inclined acutely to said one washer end face and in a direction such that said teeth are adapted to cam over the face of a workpiece when said washer is rotated in a fastener tightening direction and to cut into the juxtaposed surface of a workpiece when said washer is rotated in a fastener loosening direction, said washer having a punch-formed generally cylindrical central opening substantial portions of which have an axial length along the end thereof remote from said sharp-edged teeth not materially less than half the washer thickness, the rim edge of said cylindrical opening remote from said first end face having a ring of shallow notches formed therein which notches have relatively long generally helical bottom surfaces inclined inwardly and toward said first end face at an obtuse angle to the washer axis, the deep end of said notches having an axial and a radial depth each of which is a minor fraction of the washer thickness and the lateral edges of said helical surfaces converging into substantial merger with one another at the rim edge of said central opening, said notches having a short face lying in a generally radial plane, and said relatively long generally helical surface having a pitch extending generally in the same direction but at least double the pitch of the threads of a threaded fastener with which said washer is to be used.

2. A lock washer as defined in claim 1 characterized in that the outer periphery of said washer is provided with at least one set of hexagonal wrench engaging faces lying in planes substantially parallel to the washer axis.

3. A lock washer as defined in claim 1 characterized in that said washer is dish-shaped with said first end face being convex and the other end face being concave.

4. A lock washer as defined in claim 1 characterized in that said first washer end face is convex, and the outer radial ends of said teeth being spaced inwardly from the juxtaposed outer periphery of said washer.

5. A lock washer as defined in claim 1 characterized in that the teeth in said first end face are substantially deeper at one radial end thereof than at the other end thereof.

6. A lock washer comprising a continuous ring punched from strip metal of uniform thickness and substantially harder than the workpiece against which said ring is to be compressed in the assembly environment thereof, said washer having first and second end faces and a generally cylindrical central opening major portions of which have an axial length measured from one end face thereof not materially less than half the washer thickness and a non-circular wrench-engageable outer periphery, said first end face of said washer being upset to provide a ring of low-height teeth having a sharp edge extending generally radially thereof with one face of each inclined acutely and the other face lying generally in an axial plane whereby said teeth are adapted to cam over the surface of a workpiece when said washer is rotated thereover in a direction to tighten a fastener and whereby said teeth dig into the surface of the workpiece when said washer is rotated in a direction to loosen a fastener, and the inner rim edge of said central opening at said second end face being cold formed with a ring of long narrow notches each having a shallow end and a deep end formed by a generally helical surface inclined inwardly toward said first end face at an obtuse angle to said washer axis and lying close to and generally radially outside an imaginary similarly inclined helical surface which helical surface has a pitch circumferentially of said rim edge of the order of double the thread pitch of the fastener with which said washer is to be used, the end face of said notches at the deeper end thereof lying in a generally radial plane of said washer, and the lateral edges of said long helical surface of said notches converging and merging with one another at the rim edge of said central opening.

7. A lock washer as defined in claim 6 characterized in that said washer is dished as an incident to the punching of the said central opening from strip metal with said first end face being convex and said second end face being concave.

8. A lock washer as defined in claim 6 characterized in that the outer periphery of said washer includes two overlapping sets of hexagonally shaped surfaces lying in planes substantially parallel to the axis of said washer.

9. A lock washer as defined in claim 6 characterized in that said first washer end face is convex and said second end face is concave.

10. A self-locking vibration-proof fastener comprising a threaded shank having a wrench-seating retainer means at one end thereof, said retainer means having a frusto-conical surface sloping inwardly toward the axis of said threaded shank at an obtuse angle with the smaller end of said frusto conical surface substantially merging with said shank and having a ring of shallow teeth each having a generally radial face and a relatively long helical face having a pitch substantially in excess of the pitch of said shank threads, a wrenchable lock washer encircling said shank having an axial bore fitting loosely about said threaded shank, substantial portions of said bore on the end half thereof adjacent said frusto-conical surface being generally cylindrical, the rim edge of said bore adjacent said ring of shallow teeth on said retainer means having a ring of similar long shallow notches of varying depth circumferentially of said rim edge adapted to internest partially with the leading higher end of a respective one of said shallow teeth on said retainer means, said notches having a long generally helical surface having a pitch substantially in excess of the pitch of said shank threads and merging at the deeper end thereof with a generally radially disposed end wall surface, the lateral edges of said end wall and of said helical surface converging and merging with the rim edges of said washer bore at the respective opposite ends of said notches, the deeper end portion of said teeth on said retainer means having load bearing contact with the shallow end of a respective one of said notches in an area immediately adjacent the rim edge of said cylindrical bore and adjacent the sidewall of said threaded shank as the generally radial faces of said teeth engage said generally radial end wall of said notches whereby the tightening of said fastener loads said washer in hoop tension from a plurality of areas located about the periphery of said washer substantially at the rim edge of said cylindrical bore, and the end face of said washer remote from said notches having a ring of row-height sharp-edged barb-like teeth extending generally radially thereacross with one face of each inclined acutely and the other face inclined obtusely to said one end face and in directions to cam said washer over the surface of a workpiece as said fastener is wrenched to tighten the same and to dig into the surface of the workpiece upon any tendency of the fastener to rotate in a loosening direction.

11. A self-locking fastener as defined in claim 10 characterized in that the bore of said washer is sized to have a loose fit over said threaded shank, and radially narrow keeper ring means having a forced fit over said shank adjacent said one end face of said washer and effective to hold said washer assembled thereto in the area closely adjacent said retainer means.

12. A self-locking fastener as defined in claim 11 characterized in that said end of said opening adjacent said sharp-edged teeth is countersunk to accommodate said keeper ring means.

13. A self-locking fastener as defined in claim 10 characterized in that said washer is dished with the end thereof having said sharp-edged teeth being convex and the other end face being concave.

14. A self-locking fastener as defined in claim 10 characterized in that said threaded shank is a cap screw.

15. A self-locking fastener as defined in claim 14 characterized in that the retainer means of said cap screw is provided with a hexagonal wrench-seating well axially thereof.

16. A self-locking fastener as defined in claim 10 characterized in that said retainer means is integral with one end of said threaded shank.

17. A self-locking fastener as defined in claim 10 characterized in that said ring has a hoop tension strength capability in excess of the design load strength capability of said threaded shank.

18. A self-locking fastener as defined in claim 10 characterized in that said washer has a punched central bore, a punched non-circular outer periphery and an axially dished configuration with the convex face thereof remote from said retainer means and the concave face thereof adjacent said retainer means.

19. A self-locking fastener as defined in claim 18 characterized in that the outer ends of said sharp-edged teeth in the convex end face of said washer feather out and merge with the outer peripheral portion of said convex surface.

20. A self-locking vibration-proof fastener comprising a threaded shank having retainer means at one end of substantially larger diameter than said shank and formed with a wrench-engaging surface, the end of said retainer means facing toward the shank threading having a generally conical surface portion with the smaller end thereof merging with the shank sidewall and an inclined surface extending therefrom and terminating in formed with low height camming teeth having generally radial shoulders interconnected circumferentially of said conical surface by radially wide helical surfaces having a pitch substantially greater than one pitch of said threaded shank threads, a lock washer embracing said shank having a punch-formed generally cylindrical central bore and a punch-formed wrench-engaging periphery, said washer being of sufficient size and strength to develop the full design strength of said threaded shank as said washer is placed in high hoop tension stress by the tightening of said threaded shank with respect to a workpiece bearing against a first face of said washer, a first end of said washer having low-height barb-like teeth substantially harder than the workpiece to be clamped thereagainst and shaped to glide over the workpiece surface as said fastener is tightened and to dig into the workpiece upon any tendency of counter-rotary movement of said washer, and rim edge of said punch-formed cylindrical bore remote from said barb-like teeth having a ring of long shallow notches arranged generally end to end thereabout each having a relatively deep shouldered leading end and an inclined surface extending therefrom and terminating in a shallow trailing end, said trailing ends providing load bearing surfaces located substantially on the rim edge of said cylindrical bore closely adjacent the leading deep end of an adjacent one of said notches, the lateral edges of the inclined surfaces of said notches converging to merge with the rim edge of said central bore in an area thereof close to the deep end of an adjacent one of said notches, and the load bearing surfaces of said notches being closely adjacent the sidewall of said shank and in contact with the trailing end portion of a respective helical surface of at the deeper ends of said camming teeth on said retainer means as said fastener is being tightened and cooperating therewith to place said washer under high hoop tension as the fastener approaches a fully tightened condition.

21. A self-locking fastener as defined in claim 20 characterized in that said one washer face is convex and in that the other washer face is concave.

22. A self-locking fastener as defined in claim 21 characterized in that said barb-like teeth have a generally radially disposed sharp edge merging with said convex surface inwardly of the outer periphery of said washer.

23. A self-locking fastener as defined in claim 21 characterized in that the end of said central bore merging with said convex surface is provided with a shallow radially narrow annular recess, and a keeper ring having a press fit over said threaded shank and cooperating with said annular recess to hold said washer loosely assembled to said shank prior to the assembly of said fastener to a workpiece.

24. A self-locking fastener as defined in claim 20 characterized in that the load bearing washer surfaces include spacedapart unnotched portions of the rim edge of said central bore.

25. A self-locking fastener as defined in claim 20 characterized in that the bottom portions of said notches are inclined inwardly toward the axis of said central bore along lines intersecting said axis outwardly beyond the remote washer end face.

26. A self-locking fastener as defined in claim 20 characterized in that the major portion of the surface of said central bore is generally cylindrical.

* * * * *

UNITED STATES PATENT OFFICE
CERTIFICATE OF CORRECTION

PATENT NO. : 3,926,237
DATED : December 16, 1975
INVENTOR(S) : Max L. Enders

It is certified that error appears in the above–identified patent and that said Letters Patent are hereby corrected as shown below:

Column 10, line 37, delete "one" and insert therefor --the--.

line 51, delete "and" and insert therefor --the--.

Signed and Sealed this twenty-ninth Day of June 1976

[SEAL]

Attest:

RUTH C. MASON
Attesting Officer

C. MARSHALL DANN
Commissioner of Patents and Trademarks